US008592719B2

(12) United States Patent
Albrecht

(10) Patent No.: US 8,592,719 B2
(45) Date of Patent: Nov. 26, 2013

(54) SYSTEM AND METHOD FOR IDENTIFYING WELDING CONSUMABLE WEAR

(75) Inventor: Bruce Albrecht, Grayslake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1503 days.

(21) Appl. No.: 11/615,603

(22) Filed: Dec. 22, 2006

(65) Prior Publication Data

US 2008/0149608 A1    Jun. 26, 2008

(51) Int. Cl.
    *B23K 9/10* (2006.01)
(52) U.S. Cl.
    USPC ........................................ 219/130.1; 219/136
(58) Field of Classification Search
    USPC .............. 219/137.52, 137.7, 130.01
    See application file for complete search history.

(56) References Cited

U.S. PATENT DOCUMENTS

| | | | |
|---|---|---|---|
| 3,621,185 A | 11/1971 | Iceland et al. | |
| 4,450,341 A * | 5/1984 | Dietrick et al. | 219/137.52 |
| 4,935,598 A | 6/1990 | Ward | |
| 5,221,825 A | 6/1993 | Siewert et al. | |
| 5,514,851 A | 5/1996 | Siewert et al. | |
| 6,130,407 A * | 10/2000 | Villafuerte | 219/130.01 |
| 6,630,646 B1 | 10/2003 | Aberg et al. | |
| 6,639,181 B2 * | 10/2003 | Suzuki et al. | 219/130.01 |
| 6,963,048 B2 | 11/2005 | Huismann et al. | |
| 7,015,419 B2 | 3/2006 | Hackl et al. | |
| 2005/0279819 A1 | 12/2005 | Stava | |
| 2006/0201923 A1 | 9/2006 | Hutchison | |

FOREIGN PATENT DOCUMENTS

| | | |
|---|---|---|
| DE | 154591 A1 | 4/1982 |
| DE | 259162 A1 | 8/1988 |
| EP | 1283088 A1 | 2/2003 |
| WO | 0006335 A | 2/2000 |

OTHER PUBLICATIONS

T. P. Quinn et al., Contact Tube Wear Detection in Gas Metal Arc Welding, Welding Journal, Apr. 1995, vol. 74, No. 4, pp. 115-121.
PCT International Search Report for PCT/US2007/082105.

* cited by examiner

*Primary Examiner* — Henry Yuen
*Assistant Examiner* — Ayub Maye
(74) *Attorney, Agent, or Firm* — Quarles & Brady LLP

(57) ABSTRACT

A system and method for determining a wear condition of a welding consumable includes a welding torch having a consumable component and a wire delivery system configured to deliver wire to the welding torch during a welding process. The welding system also includes a power source configured to deliver power to the welding torch to perform the welding process. A controller is included that is configured to monitor at least one operational characteristic of the delivery of wire to the welding torch over a selected period, determine a wear condition of the consumable component from the at least one operational characteristic, and generate a signal indicating detection of the wear condition.

14 Claims, 4 Drawing Sheets

SYSTEM AND METHOD FOR IDENTIFYING WELDING CONSUMABLE WEAR

REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to a system and method for identifying wear of a welding-type consumable and, more particularly, to a system and method for indirectly determining consumable wear by identifying symptoms of wear conditions, such as micro-arcing.

Welding is a common process that often employs a consumable electrode in the form a welding wire that is fed to a weld point through a welding gun. The welding gun, among other components, may include a nozzle surrounding a tip or contact tip. The contact tip forms an axial bore through which the wire is fed to exit the welding gun. In this regard, the contact tip forms a sliding electrical contact through which power delivered from a welding power source is transferred to the wire.

By energizing the wire, the wire acts as an electrode that extends from the welding gun. When positioned near a grounded workpiece, an electrical current passes through the welding wire to the workpiece and causes the welding wire and workpiece to be heated and melt. The melted welding wire is propelled toward the workpiece where it fuses with the workpiece to effectuate the weld.

Over time, the tip and even the surrounding nozzle can begin to wear. These worn areas can cause the high currents used to perform the welding process to be localized around small areas that induce the welding wire to stick or adhere to the tip. These inconsistencies in wire feeding can result in poor welds. Accordingly, it is desirable to identify this phenomenon, typically referred to as micro-arcing or dingus, and replace the tip before an inconsistent weld or weld of poor quality is created.

In manually controlled welding systems, skilled operators are trained to identify the intermittent vibrations that are caused when the wire sticks to the contact tip as an indicator that the contact tip should be cleaned or replaced. The tip may also display movement of the contact area and varying impedance levels as the contact tip starts to degrade. Operators may also see arc instability or an erratic arc during and or prior to intermittent vibration due to contact tip degradation. However, in automated welding systems or in manual welding systems directed by an operator who has not been trained to identify these intermittent vibrations, the micro arcing may be permitted to continue until the wire eventually welds to the contact tip of the welding gun. In this case, the welding process is forced to cease due to this impediment to proper wire feeding. Beyond the fact that these intermittent feeding and instability issues occur and potentially create poor welds and interfere with efficient welding processes, they can yield excessive waste and repair time that otherwise could have been avoided if the contact tip was replaced earlier.

Accordingly, some systems have been developed that attempt to directly monitor the contact tip to identify wear conditions. For example, some systems include a sensor that monitors the resistance between the contact tip and electrode to identify changes in the resistance indicative of tip wear. However, such systems require multiple sensors arranged throughout the welding system, which requires that the primary hardware components of the welding system are specifically designed to perform such monitoring. In particular, the resistance is typically determined by calculating the ratio of the instantaneous voltage drop at the contact interface to the instantaneous welding current. In this case, a voltage sensor system must be included that is designed to measure the voltage between the electrode and the power supply. Hence, both the power supply and the welding gun must be specifically designed to calculate this voltage. In addition, the welding current is typically measured by a current sensor associated with the welding gun. Accordingly, though such wear detection systems have been developed, they are relatively complex and can be difficult to integrate with traditional welding systems that do not include the requisite sensor systems. Furthermore, these systems can be susceptible to "false positives" caused by variations in the welding power that are not attributable to contact tip wear.

Therefore, it would be desirable to have a system and method to identify worn consumables, including contact tips and welding wire, that does not require complex distributed sensor systems to directly monitor the contact tip. Furthermore, it would be desirable to have a system and method for indicating and/or automatically correcting a worn consumable.

BRIEF SUMMARY OF THE INVENTION

The present invention overcomes the aforementioned drawbacks by providing a system and method for indirectly determining a worn welding consumable. Specifically, the present invention includes a system and method for determining a worn contact tip by monitoring the delivery of welding wire during a welding process and identifying indicia of a worn contact tip from the characteristics of welding wire delivery.

In accordance with one aspect of the present invention, a welding system is disclosed that includes a welding torch having a consumable component and a wire delivery system configured to deliver wire to the welding torch during a welding process. The welding system also includes a power source configured to deliver power to the welding torch to perform the welding process. A controller is included that is configured to monitor at least one operational characteristic of the delivery of wire to the welding torch over a selected period, determine a wear condition of the consumable component from the at least one operational characteristic, and generate a signal indicating detection of the wear condition.

In accordance with another aspect of the present invention, a welding system is disclosed that includes a welding torch having a consumable and a wire feeder configured to deliver wire to the welding torch to carry out a welding process. The system also includes a sensor configured to monitor the delivery of wire to the welding torch and a controller configured to receive feedback from the sensor indicating at least one operational characteristic of wire delivery to the welding torch. The controller is also configured to determine at least one of a number, a duration, and a magnitude of anomalies in the at least one operational characteristic occurring over a selected period and generate a signal indicating detection of a wear condition of the consumable component upon determining that the at least one of the number, duration, and magnitude of anomalies occurring over the selected period is indicative of a wear condition of the consumable component.

In accordance with yet another aspect of the invention, a storage medium is disclosed that includes a computer program that when executed by a processor causes the processor to receive feedback from a sensor or sensors configured to monitor a WFS of a wire delivered from a wire feeder through a contact tip of a welding torch to a weld during a welding process. The processor is also configured to determine a characteristic of wire delivery indicative of a wear condition of the contact tip from the feedback and generate a signal indicating detection of the wear condition of the contact tip.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
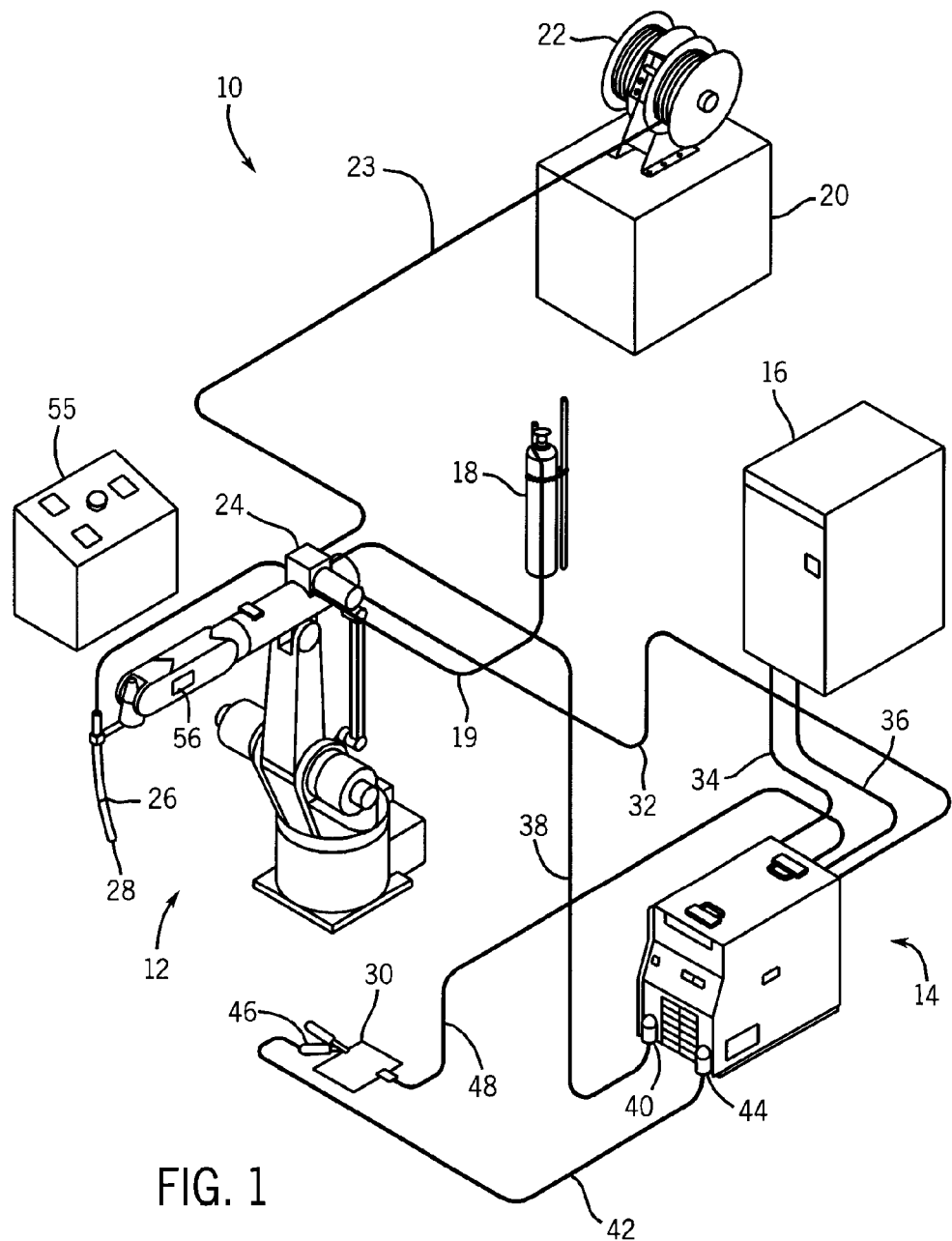
FIG. 1 is a perspective view of an automated or robotic welding system in accordance with the present invention.

Referring to FIG. 1, an automated welding system 10 includes a robotic arm 12, a power source/interface unit 14, and a robot control 16. While the present invention will initially be described with respect to robotic or automatic welding systems 10, as will be described below, the present invention is equivalently applicable to other welding systems including non-automated or non-robotic welding systems. The welding system 10 also includes a gas cylinder 18 that provides shielding gas for the welding process through an associated supply line 19. The welding system 10 is particularly applicable for MIG welding, pulsed MIG welding, and flux cored welding, such as often employed in high output and/or industrial welding environments but is also applicable to pipe welding, fabrication, hobbyists and others. However, it is contemplated that the present invention may be applicable to other welding systems and processes such as but not exclusive of submerged arc welding and laser hybrid MIG welding.

The welding system 10 further includes a wire supply source 20 having a spool 22 of welding wire 23 that is supplied by a drive assembly 24 to a welding gun 26. As illustrated in FIG. 1, the drive assembly 24 may be positioned on or adjacent to the welding gun 26. However, as will be addressed with respect to FIGS. 3 and 4, it is contemplated that the drive system may be positioned proximate to the wire supply source 20 or may be distributed between multiple areas, such as in a push-pull wire delivery system. The drive assembly 24 delivers wire 23 from the spool 22 through internal conduits formed in the robotic arm 12 to the welding gun 26, where it exits through a tip 28 to be deposited into a weld located on a workpiece 30.

The drive assembly 24 receives drive control signals from the power source 14 via a cable 32. Alternatively, the power source/interface unit 14 may wirelessly transmit and receive control signals to and from the drive assembly 24. The robot control 16 is also connected to the power source/interface unit 14 through a robot input/output cable 34. Alternatively, the robot control 16 may wirelessly communicate with the power source/interface unit 14. Optionally connected between the robot control 16 and the power source/interface unit 14 is a remote program select cable 36. It is contemplated that the robot control could control the wire feeder directly via control cable or wirelessly.

In the case of solid wire MIG welding operations, a positive weld cable 38 is connected from a positive terminal 40 of the power source/interface unit 14 to the robotic arm 12 and a negative weld cable 42 extends from a negative terminal 44 of the power source/interface unit 14 to a clamping member 46 engaged with the workpiece 30. To provide feedback to the power source/interface unit 14, an optional voltage sensing lead 48 may also be provided that is connected between the power source/interface unit 14 and workpiece 30.

Figure 2:
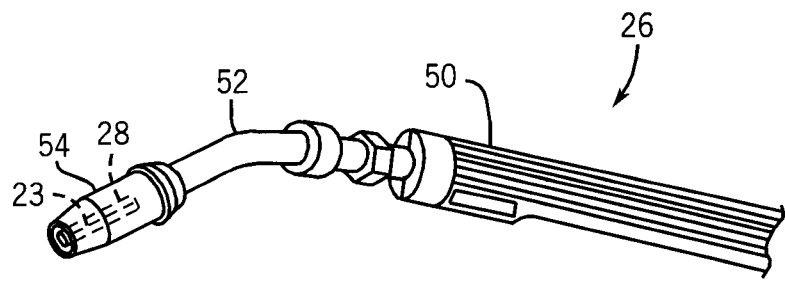
FIG. 2 is a perspective view of a MIG welding gun for use with the welding system illustrated in FIG. 1.

Referring now to FIG. 2, the welding gun 26 and tip 28 are shown in detail. The welding gun 26 is a conventional MIG welding gun that is used to initiate and a maintain welding process. The welding gun 26 includes a gun body 50 through which the consumable wire is fed in the manner described above. At the end of the gun body 50, a barrel 52 is formed that is connected to a welding nozzle 54 including the contact tip 28.

Referring to FIGS. 1 and 2, the tip or contact tip 28 forms an axial bore that provides a sliding electrical contact through which power delivered from the above-described power source/interface unit 14 is transferred to the wire 23 to form an energized electrode extending from the welding gun 26 to effectuate the welding process. In operation, when the tip 28 of welding gun 26 is positioned proximate to a workpiece 30, the welding wire comes into contact with the grounded workpiece 30 and an electrical current passes through the welding wire 23 to the workpiece 30 causing the welding wire 23 to be heated and melt. As a result, an electrical arc is established that causes the welding wire 23 to continue to melt and initiates a transfer of melted welding wire to the workpiece 30 where the welding wire 23 fuses with the workpiece 30. Because the electrical energy supplied by the power source/interface unit 14 is typically greater than that required to melt the welding wire 23, most of the remaining energy heats the tip 28 and workpiece 30. As a result, the area on the workpiece 30 surrounding the weld also melts, which yields an improved bonding between the melted welding wire and the workpiece 30.

Over time, the tip 28 and surrounding nozzle 54 begin to wear. As described above, these worn areas can cause the high currents used to perform the welding process to be localized around small areas that induce the welding wire to stick or adhere to the tip 28. This phenomenon, typically referred to as micro-arcing or dingus, if allowed to continue, eventually results in the wire 23 burning onto the tip 28 to create a bond sufficient to impede continued feeding of the wire 23.

Accordingly, as will be described in detail with respect to FIGS. 4 and 5, the present invention includes a system and method to automatically detect consumable wear and facilitate cleaning or replacement of the consumables prior to the wire 23 burning onto the tip 28 and causing a forced shutdown of the welding process. Specifically, as shown in FIG. 1, a consumable cleaning and/or replacement station 55 is included. The consumable cleaning/replacement station 55 is configured to automatically clean and/or replace welding consumables, such as the contact tip 28, the nozzle 54, and the welding wire 23. For example, to clean the consumables, the consumable cleaning/replacement station 55 is configured to clean the nozzle 54 and tip 28 and trim the welding wire 23 to remove any wire that has solidified into a ball about the end of the wire 23.

Alternatively, for example, if cleaning would be insufficient to repair the consumables or if cleaning is otherwise undesired, the consumable cleaning/replacement station 55 may automatically change the nozzle 54 and tip 28. As will be described in detail with respect to FIG. 5, the automated welding system 10 may be configured to automatically discontinue the welding process upon detecting a consumable wear condition and move the welding gun 26 to the consumable cleaning/replacement station 55 where the nozzle 54 of the welding gun 26 is gripped by a robot that removes the nozzle 54 and contact tip 28 and replaces them with a new nozzle and contact tip. It is contemplated that this automated consumable replacement process may be further facilitated by the use of specialized systems that streamline automated replacement. It is also contemplated that the tip can be replaced independent of replacing the nozzle.

For example, it is contemplated that systems such as the Center Fire consumable system available from Bernard Welding Equipment Company Corporation may be used. In this case, the nozzle 54 is gripped and rotated by the consumable cleaning/replacement station 55 to remove the nozzle 54. It is contemplated that the nozzle 54 may be gripped using a passive pressure device, such as a tight fit or springs, or may be gripped using active pressure devices, such as servo motors, solenoids, and the like. Additionally, it is contemplated that replacement nozzles may include a preloaded contact tip. Alternatively, it is contemplated that a variety of nozzles and contract tips may be mounted on a turntable or other device and coupled together by a robot at the consumable cleaning/replacement station 55. In any case, the consumable cleaning/replacement station 55 then engages the replacement nozzle and contact tip with the welding torch 26 and rotates the combination to be locked therewith. The welding gun 26 then returns to the workpiece 30 to continue the welding process. It is also contemplated that the act of rotating the nozzle can occur via the robot arm.

An alert generator 56 may also be included that is configured to provide a visual and/or auditory alert indicating that a worn consumable has been detected. As such, the optional alert generator 56 may work in concert with or in lieu of the consumable cleaning/replacement station 55. The alert generator 56 may include a visual indicator such as a light or illuminated sign. Additionally or alternatively, the alert generator 56 may include an audible alarm. The alert is not limited to but could include a visual or audible alert on the power source, robot control, or robot pendant. The alert could also be transmitted via internet, serial communications and or wireless technology. In the case of an automated welding system such as illustrated in FIG. 1, alert generator 56 may be arranged proximate to the robotic arm 12. However, it is also contemplated that the alert generator 56 may be arranged at the welding power source 14 or remotely at a centralized monitoring and/or control station.

Figure 3:
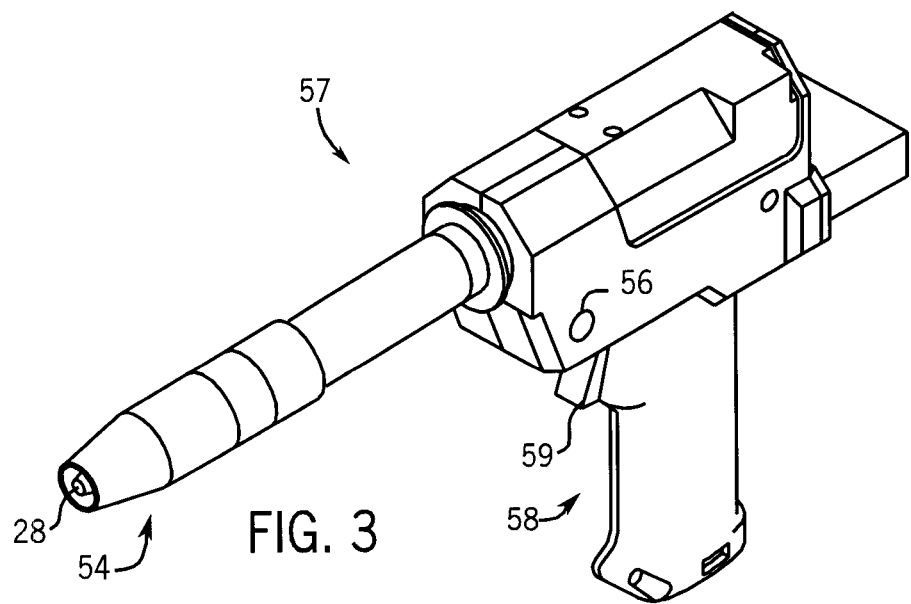
FIG. 3 is a perspective view of another MIG welding gun for use with a manually controlled welding system.

Referring now to FIG. 3, though described above with respect to robotic welding systems, it is contemplated that the present invention is equally applicable to manually controlled welding processes and systems. In this case, the welding gun may be a manually controlled welding gun 57. The welding gun 57 includes a handle 58 that is held in the hand of an operator and a trigger 59 that initiates and discontinues the welding process. In the case of a manually controlled welding system, the alert generator 56 may be arranged on a welding gun 57 to immediately alert the operator that a consumable wear condition has been determined and prompt the operator to repair or replace the worn consumables.

The welding guns 26, 57 illustrated in FIGS. 2 and 3 are exemplary only and a wide variety of other welding guns and configurations are applicable with the present invention. For example, spool-type guns that include an independent source of welding wire housed within an internal spool or other welding guns/systems may be used with the present invention.

Figure 4:
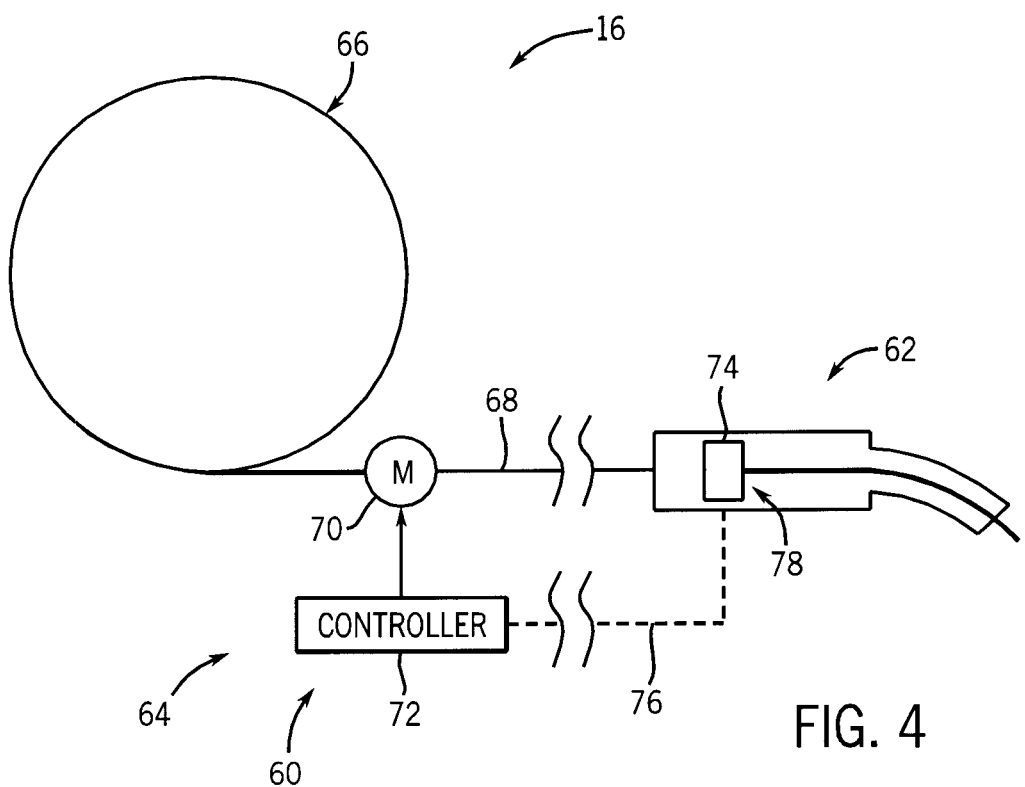
FIG. 4 is a schematic of a wire delivery system and welding gun assembly including a sensor and controller system for monitoring wire delivery conditions in accordance with the present invention.

Referring to FIG. 4, regardless of the specific welding gun or whether the welding system is robotic or manually controlled, a wire monitoring system 60 can be incorporated into the welding gun 62 and/or overall wire delivery system 64. In particular, FIG. 4 shows a schematic illustration of a portion of the wire delivery system 64 that includes a wire monitoring system 60. The wire delivery system 64 includes a spool 66 of consumable weld wire 68. A motor and drive module 70 pulls the consumable weld wire 68 from the spool 66 and pushes the pulled weld wire 68 toward the welding gun 62. As described above, it is also contemplated that the motor and drive module 70 may be integrated with the welding gun 62 or may be part of a push-pull motor drive system. The motor and drive module 70 causes the wire 68 to be delivered to the welding gun 62 at a wire feed speed (WFS) that is commanded by a controller 72. The controller 72 may be a separate entity from the above-described systems or it may be part of existing hardware and or software in the power supply, wire feeder, or robot. The controller 72 commands the motor and drive module 70 to maintain a desired WFS, which results in the wire 68 being delivered to the weld at the desired speed.

Generally, there is a direct relationship between WFS and weld voltage. To maintain arc stability, WFS must be adjusted to match changes in weld voltage. Specifically, if the weld voltage increases, the WFS must be increased to maintain the stability of the welding arc. As such, a WFS sensor 74 is included that provides feedback to the controller 72 over a communications line 76 or wirelessly to indicate the actual WFS at or near the weld. Additionally, the WFS sensor 74 may be configured to provide feedback regarding the direction of wire travel and, in some cases, the WFS sensor 74 is designed to provide feedback regarding changes in wire feed direction. The controller 72 uses the feedback from the WFS sensor 74 to accurately command the motor and drive module 70 to achieve the desired adjustment in WFS in response to a weld voltage change. However, as will be described, the controller 72 also uses the feedback to indirectly determine consumable wear. For example, as will be described, the controller 72 uses the feedback to determine conditions indicative of tip or nozzle wear.

It is contemplated that the WFS sensor 74 may be a contact or contact-less sensor. For example, the WFS sensor 74 may include a tachometer that rides against the wire 68 and provides feedback indicating the actual WFS at or near the weld based on the speed of rotation of the tachometer. Alternatively or additionally, the WFS sensor 74 may include a touch-less sensor.

A number of different types of touch-less sensors are contemplated. For example, one suitable sensor is an optical sensor that optically senses translation of consumable wire 68 without being in contact with the wire 68. In this case, the sensor 74 is arranged proximate to a feed channel 78 formed in the welding gun 62 through which the consumable wire 68 travels before being directed to the weld. The optical sensor may directly sense translation of the consumable wire 68 or may sense the translation of optical indicators arranged on the wire 68.

Additionally or alternatively, an electromagnetic coil may also be used to monitor WFS. Specifically, as the consumable wire 68 passes by the sensor 74, an electromagnetic coil may be used to induce a current. At defined intervals of wire feed length, an indicator may be incorporated to cause a rise or drop in the current that is induced in the coil when each indicator passes through the coil. As such, the controller 72 can measure, using the electromagnetic coil, the temporal difference between changes in the induced current and, thus, determine the speed of the wire.

While the WFS sensor 74 is illustrated in FIG. 4 as being arranged within welding gun 62, it is contemplated that WFS sensor 74 may also be placed externally to the welding gun 62. In this regard, it is contemplated that the WFS sensor 74 may be positioned at an inlet or outlet end of the welding gun 62. It is also contemplated that the WFS sensor 74 may be positioned proximate to the motor and drive module 70 or the spool 66. However, it is preferred that WFS sensor 74 is positioned proximate to the weld so that, as will be described, the WFS sensor 74 is highly sensitive to even small changes in WFS, such as might be attributable to consumable wear. Furthermore, by arranging the WFS sensor 74 and controller 72 in the welding gun 62, the above-described system can be integrated into existing welding systems by simply replacing the welding gun. That is, it is contemplated that the present invention can be quickly and easily retrofitted into existing welding systems by simply replacing the welding gun with the above-described welding gun 62 including the WFS monitoring and processing components.

Figure 5:
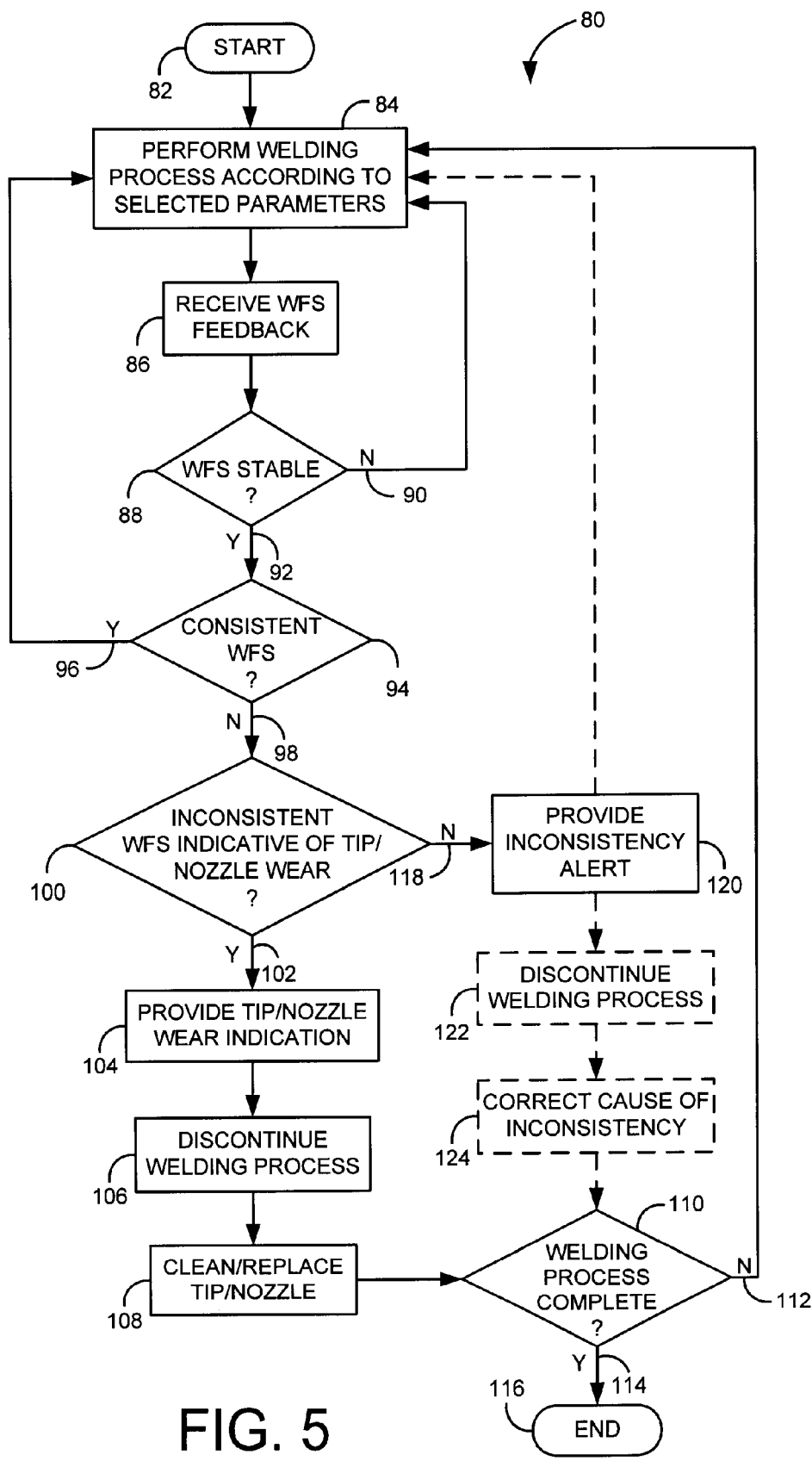
FIG. 5 is a flow chart setting forth the steps of a method for determining consumable wear conditions in accordance with the present invention.

Referring now to FIG. 5, the steps of a method 80 for determining consumable wear conditions in accordance with the present invention starts 82 with the initiation of a welding process according to operator-selected parameters 84. Once the welding process has been initiated 84, the above-described WFS sensor begins generating feedback that is received and analyzed by the above-described controller 86. Using the feedback 86, the controller determines whether the WFS appears to be stable 88. That is, a check is made to determine whether the WFS is generally stable 88 or is increasing or decreasing significantly, such as during start-up of the welding process or as required to compensate for a significant change in the welding process. If the WFS is not currently stable 90, the controller continues to receive feedback 84, 86 until the WFS stabilizes 92.

Once the WFS has been determined to be stable 92, a check is made to determine whether the WFS has been consistent over a given period 94. It is contemplated that the period from which feedback is reviewed to determine consistency may be user defined or may be selected automatically based on the operational parameters of the welding process being performed. As such, the period may extend over a period of welds or over one weld. Additionally or alternatively, it is contemplated that the period for review may be determined in real-time or may be adjusted in real-time based on historical data corresponding to the specific welding system or a particular welding process being performed.

If the WFS is consistent 96, the welding process is continued 84. On the other hand, if the WFS is inconsistent 98, the system determines whether the inconsistent WFS is indicative of tip and/or nozzle wear 100. This is achieved by identifying "inconsistency events" that are indicative of tip and/or nozzle wear.

To identify an "inconsistency event", the system reviews the feedback 86 for indications that the consumable wire is periodically adhering to the contact tip of the welding gun. Such periodic adhesions of the wire to the contact tip induces intermittent vibrations in the wire and welding gun due to the momentary impediment to the wire being improperly fed into the weld. Hence, an "inconsistency event" may be identified using any of a variety of criteria. For example, an "inconsistency event" may be identified from a momentary change in WFS that was not directed by the controller or a vibration induced in the wire or other condition that is indicative of the wire sticking to the contact tip.

To determine that such inconsistencies in the WFS are indicative of tip and/or nozzle wear 100, the system reviews the WFS feedback 86 for intermittent inconsistency events that, collectively, are indicative of the wire intermittently adhering to the contact tip. For example, it is contemplated that a selected number of "inconsistency events", a selected duration of "inconsistency events", a selected frequency of "inconsistency events", and/or a selected magnitude of "inconsistency events" may be used to identify inconsistent WFS over the period described above. The precise number of events for each evaluation may be predetermined, user selected, or dynamically selected based on prior operation or the current welding process.

If the inconsistent WFS is indicative of tip and/or nozzle wear 102, the system may then provide a tip/nozzle wear indication 104. As described above, this indication 104 may take many forms and may even be optional in many systems. For example, the indication may include a visual indicator such as a light or illuminated sign and may include an auditory indicator. In the case of a manually controlled welding system, the visual and/or auditory indicator may be arranged on a welding gun, such as described above with respect to FIG. 3, to immediately alert the operator that a significant consumable wear condition has been determined. In the case of an automated welding system, such as described above with respect to FIG. 1, the optional visual and/or auditory indicator may be on or at a distance from the robotic welding gun. For example, the indicator may be arranged at the welding power source or remotely at a centralized monitoring and/or control station and may even be omitted due to the above-described automatic consumable replacement system.

Once the system has determined that the inconsistencies in the WFS are indicative of tip and/or nozzle wear 102 and, if included, an indication of this determination has been made 104, the welding process is discontinued 106. In the case of a manual welding system, discontinuing the welding process is controlled by the operator. On the other hand, in the case of a robotic welding system, discontinuing the welding process 106 can occur automatically in response to determining inconsistent WFS indicative of tip and nozzle wear 102. As described above, while in a manual welding system replacement of the tip and nozzle 108 would be done by the operator, in the robotic welding system, replacement or cleaning of the tip and nozzle 108 may be automated.

Once the tip and/or nozzle has been cleaned/replaced 108, a check is made to determine whether the welding process is complete 110. If not 112, the welding process is restarted 84. If the welding process is complete 114, the method ends 116.

Referring back to the determination of whether the inconsistent WFS is indicative of tip/nozzle wear 100, if the consistent WFS is not indicative of tip/nozzle wear 118, the system provides an alert of the identified inconsistency 120. For example, the system may be configured to identify conditions caused by liner errors, low voltage conditions, kinked welding cables, and the like that can cause inconsistent WFS but that have characteristics that can be differentiated from tip/nozzle wear. As previously described, such an alert may be visual and/or include audio and may be generated at one or more areas on or about the welding system. Once the alert has been issued 120, one of a variety of processes may follow. For example, the welding process may be automatically or manually discontinued 122 or, if the inconsistent WFS is automatically or manually determined to be relatively insubstantial, the welding process may simply continue 84. If the welding process is discontinued 122, the cause of the inconsistency may be automatically or manually corrected 124 and, thereafter, if a welding process is incomplete 110, 112, the welding process can be restarted.

Therefore, the above-described system and method permits indirect determination of a worn welding consumable. Specifically, the present invention includes a system and method for determining a worn contact tip by monitoring the delivery of welding wire during a welding process and identifying indicia of a worn contact tip from the characteristics of welding wire delivery.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

I claim:

1. A welding system comprising:
    a welding torch including a consumable component;
    a wire delivery system configured to deliver wire to the welding torch during a welding process;
    a power source configured to deliver power to the welding torch to perform the welding process;
    a sensor configured to monitor wire feed speed (WFS) data of a consumable wire being fed to the welding torch over a selected period; and
    a controller coupled to the sensor and configured to:
        analyze the WFS data to detect WFS inconsistency events, the WFS inconsistency events including variations in WFS of the consumable wire indicative of a wear condition of the welding torch;
        determine a wear condition of the consumable component by analyzing the WFS inconsistency events; and
        generate a signal indicating detection of the wear condition.

2. The welding system of claim 1 wherein the controller is further configured to detect variations in the WFS indicative of the wear condition and generate the signal indicating detection of the wear condition upon detecting at least one of a selected number of variations in the WFS indicative of the wear condition within the selected period, a selected duration of variations in the WFS indicative of the wear condition within the selected period, a selected frequency of variations in the WFS indicative of the wear condition within the selected period, and a selected magnitude of variations in the WFS indicative of the wear condition within the selected period.

3. The welding system of claim 1 further comprising an alert generator configured to generate at least one of a visual alert and an audio alert in response to the signal indicating detection of the wear condition.

4. The welding system of claim 1 wherein the power source is configured to discontinue the welding process in response to the signal indicating detection of the wear condition.

5. The welding system of claim 1 further comprising a consumable replacement station configured to automatically change the consumable component of the welding torch in response to the signal indicating detection of the wear condition.

6. The welding system of claim 1 further comprising a consumable cleaning station configured to automatically clean the consumable component of the welding torch in response to the signal indicating detection of the wear condition.

7. The welding system of claim 1 wherein the consumable includes at least one of a contact tip and a nozzle.

8. The welding system of claim 1 further comprising at least one contact-less sensor configured to monitor one of delivery of a consumable wire to the welding torch and vibrations induced in the welding torch and provide feedback to the controller about the at least one operational characteristic.

9. A welding system comprising:
    a welding torch including a consumable component;
    a wire feeder configured to deliver wire to the welding torch to carry out a welding process;
    at least one sensor configured to monitor the wire feed speed (WFS) of delivery of wire to the welding torch;
    a controller configured to:
        receive feedback from the at least one sensor indicating the WFS of wire delivery to the welding torch;
        determine at least one of a number, a duration, and a magnitude of anomalies in the WFS occurring over a selected period, the anomalies including intermittent variations in WFS;
        determine whether the at least one of the number, duration, and magnitude of anomalies occurring over the selected period is indicative of a wear condition of the consumable component;
        generate a signal indicating detection of a wear condition of the consumable component upon determining that the at least one of the number, duration, and magnitude of anomalies occurring over the selected period is indicative of a wear condition of the consumable component; and
    wherein the anomalies in the at least one characteristic of wire delivery include intermittent variations in WFS.

10. The system of claim 9 wherein the at least one sensor includes at least one of an optical sensor, an electromagnetic sensor, and a tachometer configured to track movement of wire from the wire feeder to the welding torch to carry out a welding process.

11. The system of claim 9 further comprising a robotic controller configured to control the welding torch during the welding process.

12. The system of claim 9 further comprising an alert generator configured to generate at least one of a visual alert and an audio alert in response to the signal indicating detection of the wear condition.

13. The system of claim 11 further comprising a consumable cleaning station and wherein the robotic controller is configured to discontinue the welding process in response to the signal indicating detection of the wear condition and move the welding torch to the consumable cleaning station to automatically clean the consumable component of the welding torch.

14. The system of claim 11 further comprising a consumable replacement station and wherein the robotic controller is configured to discontinue the welding process in response to the signal indicating detection of the wear condition and move the welding torch to the consumable replacement station to automatically change the consumable component of the welding torch.

* * * * *